Sept. 14, 1937. A. E. LOOKHOLDER Re. 20,502

INNER TUBE TESTING DEVICE

Original Filed Feb. 3, 1936 2 Sheets-Sheet 1

Inventor:
Alley E. Lookholder,
By: Bertha L. MacGregor
Attorney.

Sept. 14, 1937. A. E. LOOKHOLDER Re. 20,502

INNER TUBE TESTING DEVICE

Original Filed Feb. 3, 1936 2 Sheets-Sheet 2

Inventor:
Alex E. Lookholder,
By: Bertha L. MacGregor
Attorney

Reissued Sept. 14, 1937

Re. 20,502

UNITED STATES PATENT OFFICE 20,502

INNER TUBE TESTING DEVICE

Alex E. Lookholder, La Grange, Ill.

Original No. 2,048,191, dated July 21, 1936, Serial No. 62,085, February 3, 1936. Application for reissue September 23, 1936, Serial No. 102,179

20 Claims. (Cl. 73—51)

This invention relates to inner tube testing devices. Usually inner tubes are inflated and immersed in water for detecting air bubbles indicating imperfections. The main object of my invention is to provide apparatus for the purpose stated, by means of which the user may inspect tubes without wetting his hands and without injury to the inner tubes by stretching or otherwise.

Another object is to provide apparatus for use in testing inner tubes of varying sizes, and without injury to or interference by the valve stems of said tubes.

The apparatus facilitates the testing of inner tubes by keeping the tube submerged in a convenient manner, which is difficult to do by hand.

Figure 1:
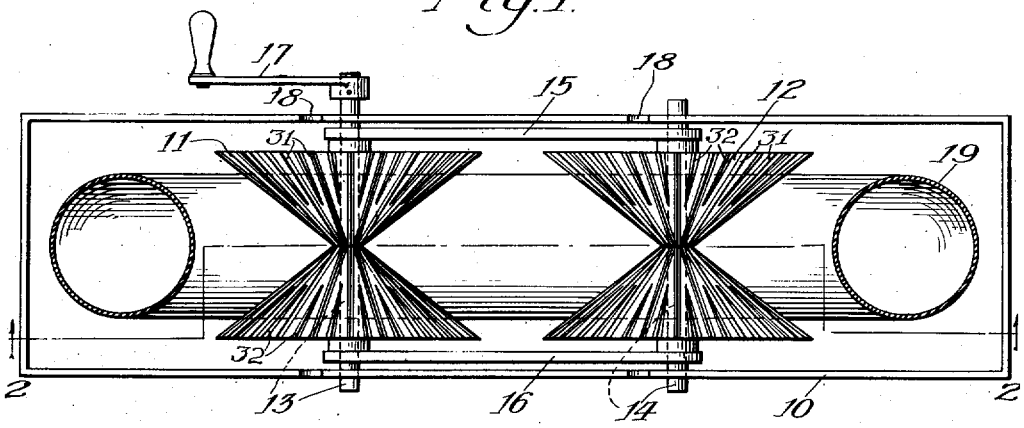
Fig. 1 is a plan view of an inner tube testing device embodying my invention.
Figure 2:
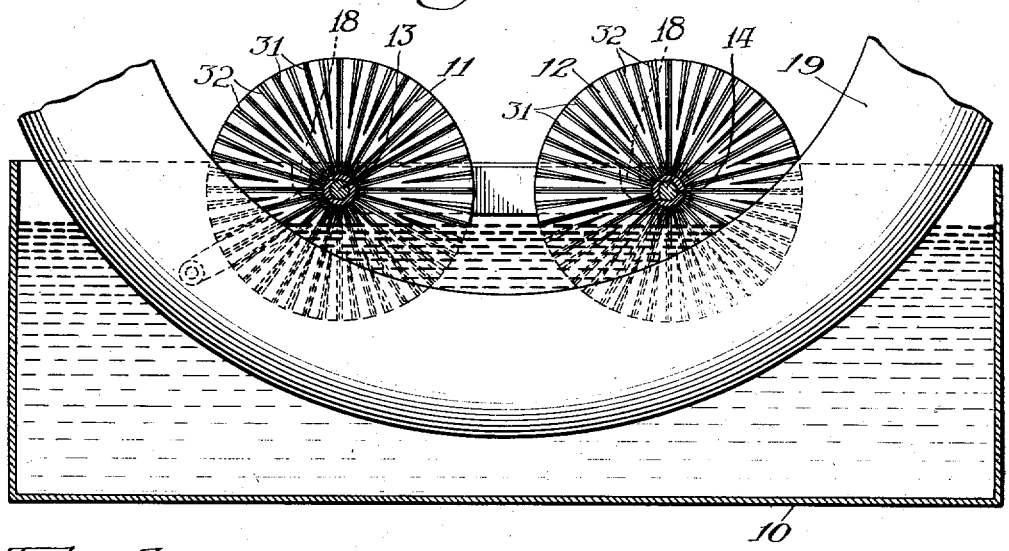
Fig. 2 is a vertical, longitudinal sectional view taken on the line 2—2 of Fig. 1.
Figure 3:
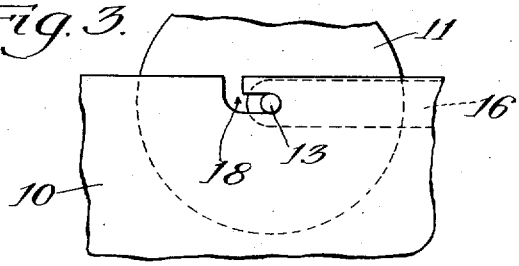
Fig. 3 is a fragmentary view showing a detail of construction.

In that embodiment of my invention shown in Figs. 1 to 3, inclusive, the testing device is portable and non-fixedly associated with a water holding tank 10 which is preferably wider than the diameter of the largest inner tubes intended to be tested, for example, such as twelve or thirteen inch truck tubes. The length of the tank 10 will also be sufficient to accommodate a portion of the tube in the manner shown in the drawings.

The testing apparatus comprises a pair of rollers 11, 12, each preferably consisting of two oppositely disposed cone-shaped members, the bases of the cones forming the outer ends of the rollers, and the apexes being abutting or near each other. The roller 11 is fixedly mounted on a shaft 13, to rotate therewith, and the roller 12 is loosely mounted on a shaft 14. The shafts 13 and 14 are slightly longer than the transverse dimension of the tank 10, and are connected by frame members or side bars 15, 16. The shaft 14 may be fixedly mounted in the side bars 15 and 16, because the roller 12 is loosely mounted on said shaft, but the shaft 13 is rotatable in said side bars 15 and 16, and is provided with a crank 17 for manually rotating the shaft 13 and roller 11.

The testing apparatus may be mounted in and supported by the tank 10 in any suitable manner. I have shown four bayonet slots 18, two in each side wall of the tank, suitably spaced to receive the ends of shafts 13 and 14. In using the apparatus, the tube 19 to be tested is first placed in the tank 10, as shown, and then the frame members 15 and 16, carrying the shafts 13 and 14 and the rollers 11 and 12, may be lowered into the tank with the ends of the shafts 13 and 14 entering the vertical portions of the slots so as to be held in operative poistions above the tube 19. The tube 19, being buoyant, will engage the rollers 11 and 12, and when the roller 11 is actuated by turning the crank 17, the tube will be moved with it but without stretching or injuring the tube. Such movement of the tube will cause the roller 12 to be rotated on its shaft 14.

In the embodiment shown in the drawings, the tube is a relatively large one, but the same rollers will accommodate smaller tubes. The roller shafts are so spaced that about eight inches or more of the length of the tube may be visible between the rollers. The shape of the rollers is preferably such that a relatively acute angle or deep groove is formed circumferentially, midway between the roller ends, to accommodate the valve stem of the tube, and produce engagement of the roller with only side portions of the tube walls.

Figure 4:
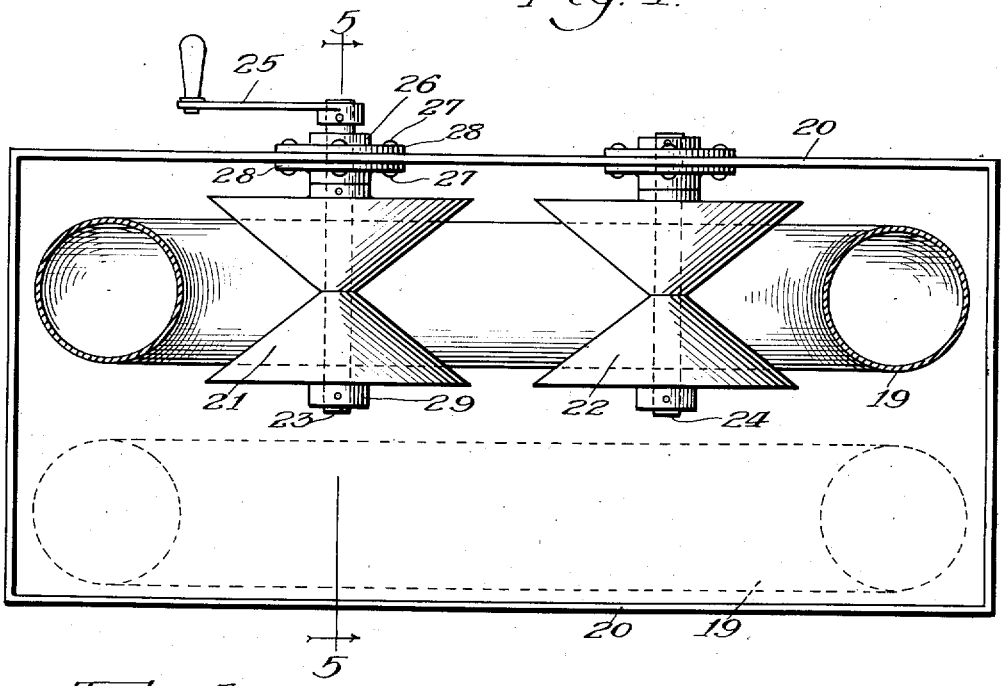
Fig. 4 is a plan view showing a modified embodiment of the invention.
Figure 5:
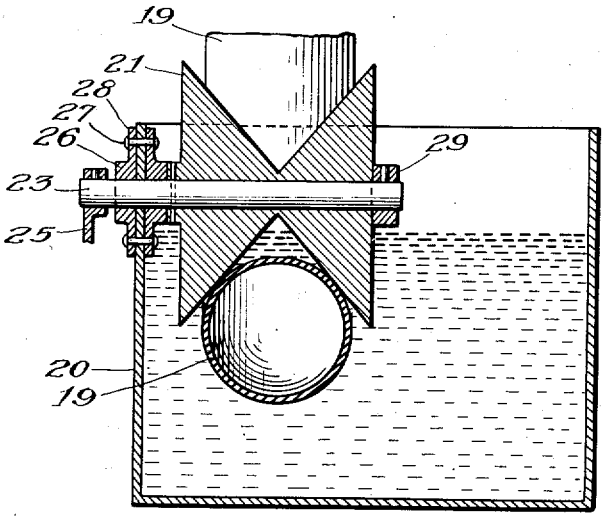
Fig. 5 is a transverse, vertical sectional view taken on the line 5—5 of Fig. 4.
Figure 6:
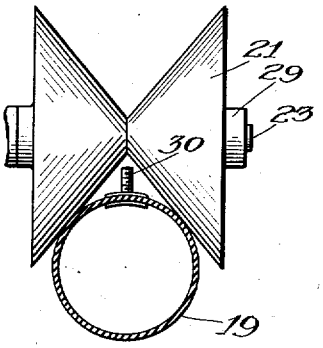
Fig. 6 shows one of the rollers in elevation and an inner tube in section.

In the modified form of construction shown in Figs. 4 to 6, inclusive, the testing apparatus is mounted in the tank and is portable with the same, but not independently thereof. The tank 20 is wider than the tank 10, in order to permit the tube 19 to be lowered into the tank and then be moved from the dotted to the full line position shown in Fig. 4, beneath the rollers 21 and 22. The rollers are identical with the previously described rollers 11 and 12, but they are mounted on stub shafts 23 and 24, respectively, which extend through the tank wall and about half way across the width of the tank 20. The roller 21 is fixed to rotate with shaft 23 and roller 22 is loose on shaft 24. The crank on the outer end of the shaft 23 is indicated at 25. Bearing members 26 are secured by rivets 27 extending through flanges 28 of said members 26, to the inner and outer surfaces of one side wall of the tank 20, to support the shafts 23 and 24 in horizontal positions. A nut 29 holds each roller on its shaft. In Fig. 6 the valve stem 30 of the tube 19 is shown.

The operation of the modified construction is the same as that of the apparatus shown in Figs.

1 to 3, heretofore described, with the exceptions noted.

I prefer to provide means for driving one of the roller shafts although obviously both rollers may be loose on their shafts and be actuated by the manual movement of the inner tube by the operator.

In the form of construction shown in Figs. 1 to 3, inclusive, I have shown the rollers 11, 12 as provided with ribs for preventing slipping of the rollers relatively to the inner tubes to be tested. As shown the rollers 11 and 12 are provided with long ribs 31 and intermediate shorter ribs 32. These ribs produce positive traction on the tube. The ribs may be of uniform width or they may be tapered or of any desired conformation whereby the engagement between the rollers and tubes is facilitated. Although the rollers in Figs. 4 to 6, inclusive, are shown as having plain surfaces, it will be understood that preferably they are also provided with ribs, knurling or other irregularities for the purpose stated.

Changes may be made in details of construction without departing from the scope of my invention and I do not intend to be limited to the exact form shown and described, except as set forth in the appended claims.

I claim:

1. An inner tube testing device comprising a tank, a pair of horizontally disposed shafts extending transversely of the tank, one end of one of the shafts extending through the tank wall and having a crank on said end, a roller on each shaft, and means for mounting the shafts and rollers in the tank in a plane spaced from the tank bottom and ends a distance greater than the width of the tube to be tested, whereby the tube is held submerged beneath the rollers when water is placed in the tank.

2. An inner tube testing device comprising a tank, a horizontally disposed shaft mounted at one end in a side wall of the tank and extending transversely of the tank, said end of the shaft extending through the tank wall, and having a crank on said end, and a roller on the shaft, said shaft being spaced from the bottom and from one side of the tank a distance sufficient to enable the tube to be tested to be passed between the shaft end and tank side and to occupy an unobstructed space between the roller and the bottom of the tank.

3. An inner tube testing device comprising a tank, a pair of horizontally disposed shafts extending transversely of the tank, frame members connecting said shafts in spaced apart positions, a roller on each saft, and means for manually rotating one of the rollers, and means for mounting the shafts in the tank in a horizontal plane spaced from the bottom a distance sufficient to enable the tube to be tested to occupy an unobstructed space between the rollers and the bottom of the tank.

4. An inner tube testing device comprising a tank, a pair of horizontally disposed shafts extending transversely of the tank, frame members connecting said shafts in spaced apart positions, a roller on each shaft, and means for manually rotating one of the rollers, said tank being provided with slots in its side walls for receiving the ends of said shafts.

5. An inner tube testing device adapted for use with a water containing tank, comprising a pair of shafts, frame members connecting the shafts in spaced, parallel positions, and a roller on each shaft between said frame members, the shafts and frame members being in approximately one horizontal plane between the upper and lower surfaces of the rollers, and said testing device being portable independently of the tank.

6. An inner tube testing device adapted for use with a water containing tank, comprising a pair of shafts, frame members connecting the shafts in spaced, parallel positions, a roller on each shaft between said frame members, and means for rotating one of said shafts, the shafts and frame members being in approximately one horizontal plane between the upper and lower surfaces of the rollers, and said testing device being portable independently of the tank.

7. An inner tube testing device comprising a tank, a pair of horizontally disposed shafts extending transversely of the tank, one end of one of the shafts extending through the tank wall and having a crank on said end, a roller on each shaft, and means for mounting the shafts and rollers in the tank in a plane spaced from the tank bottom and ends a distance greater than the width of the tube to be tested, whereby the tube is held submerged beneath the rollers when water is placed in the tank, the circumference of said rollers decreasing radically from each of the two ends to the center whereby the tube to be tested is engaged on its two side walls without contacting the intermediate portions of said tube walls.

8. An inner tube testing device comprising a tank, a pair of horizontally disposed shafts extending transversely of the tank, one end of one of the shafts extending through the tank wall and having a crank on said end, a roller on each shaft, and means for mounting the shafts and rollers in the tank in a plane spaced from the tank bottom and ends a distance greater than the width of the tube to be tested, whereby the tube is held submerged beneath the rollers when water is placed in the tank, said rollers each comprising a pair of oppositely disposed cones having their apexes abutting each other.

9. An inner tube testing device comprising a tank, a pair of horizontally disposed shafts extending transversely of the tank, one end of one of the shafts extending through the tank wall and having a crank on said end, a roller on each shaft, and means for mounting the shafts and rollers in the tank in a plane spaced from the tank bottom and ends a distance greater than the width of the tube to be tested, whereby the tube is held submerged beneath the rollers when water is placed in the tank, said rollers being provided with irregular surfaces and their circumferences decreasing radically from each of the two ends to the center whereby the tube to be tested is engaged on its two side walls without contacting the intermediate portions of said tube walls.

10. An inner tube testing device comprising a tank, a pair of horizontally disposed shafts extending transversely of the tank, a roller on each shaft, and means for mounting the shafts and rollers in the tank in a plane spaced from the tank bottom and ends a distance greater than the width of the tube to be tested, whereby the tube is held submerged beneath the rollers when water is placed in the tank.

11. An inner tube testing device comprising a tank, a horizontally disposed shaft mounted at one end in a side wall of the tank and extending transversely of the tank, said end of the shaft extending through the tank wall, and a roller on the shaft, said shaft being spaced from the bottom and from one side of the tank a distance sufficient to enable the tube to be tested to be passed between the shaft end and tank side and to occupy an unobstructed space between the roller and the bottom of the tank.

12. An inner tube testing device comprising a tank, a pair of horizontally disposed shafts extending transversely of the tank, frame members connecting said shafts in spaced apart positions, a roller on each shaft, and means for mounting the shafts in the tank in a horizontal plane spaced from the bottom a distance sufficient to enable the tube to be tested to occupy an unobstructed space between the rollers and the bottom of the tank.

13. An inner tube testing device comprising a tank, a pair of horizontally disposed shafts extending transversely of the tank, frame members connecting said shafts in spaced apart positions, and a roller on each shaft, said tank being provided with slots in its side walls for receiving the ends of said shafts.

14. An inner tube testing device comprising a tank, a pair of horizontally disposed shafts extending transversely of the tank, a roller on each shaft, and means for mounting the shafts and rollers in the tank in a plane spaced from the tank bottom and ends a distance greater than the width of the tube to be tested, whereby the tube is held submerged beneath the rollers when water is placed in the tank, the circumference of said rollers decreasing radically from each of the two ends to the center whereby the tube to be tested is engaged on its two side walls without contacting the intermediate portions of said tube walls.

15. An inner tube testing device comprising a tank, a pair of horizontally disposed shafts extending transversely of the tank, a roller on each shaft, and means for mounting the shafts and rollers in the tank in a plane spaced from the tank bottom and ends a distance greater than the width of the tube to be tested, whereby the tube is held submerged beneath the rollers when water is placed in the tank, said rollers being provided with irregular surfaces and their circumferences decreasing radically from each of the two ends to the center whereby the tube to be tested is engaged on its two side walls without contacting the intermediate portions of said tube walls.

16. An inner tube testing device comprising a tank, a horizontally disposed shaft extending transversely of the tank, a roller on the shaft, and means for mounting the shaft and roller in the tank in a plane spaced from the tank bottom and ends a distance greater than the width of the tube to be tested, whereby the tube is held submerged beneath the roller when water is placed in the tank, said roller and the tube to be tested having frictional engagement with each other and the axes of the roller and said tube being non-coincident, whereby said tube travels relatively to the roller while the roller is rotated.

17. An inner tube testing device comprising a tank, a horizontally disposed shaft extending transversely of the tank, a roller on the shaft, and means for mounting the shaft in the tank in a horizontal plane spaced from the bottom a distance sufficient to enable the tube to be tested to occupy an unobstructed space between the roller and the bottom of the tank, said roller and the tube to be tested having frictional engagement with each other and the axes of the roller and said tube being non-coincident, whereby said tube travels relatively to the roller while the roller is rotated.

18. An inner tube testing device comprising a tank, a horizontally disposed shaft extending transversely of the tank, and a roller on the shaft, said tank being provided with slots in its side walls for receiving the ends of said shaft, and said shaft when mounted in said slots being spaced from the bottom of the tank a distance sufficient to enable the tube to be tested to occupy an unobstructed space between the roller and the bottom of the tank, the tube being held submerged beneath the roller when water is placed in the tank.

19. An inner tube testing device comprising a tank, a horizontally disposed shaft extending transversely of the tank, a roller on the shaft, and means for mounting the shaft and roller in the tank in a plane spaced from the tank bottom and ends a distance greater than the width of the tube to be tested, whereby the tube is held submerged beneath the roller when water is placed in the tank, the circumference of said roller decreasing radically from each of the two ends to the center whereby the tube to be tested is engaged on its two side walls without contacting the intermediate portions of said tube walls.

20. An inner tube testing device comprising a tank, a horizontally disposed shaft extending transversely of the tank, a roller on the shaft and means for mounting the shaft and roller in the tank in a plane spaced from the tank bottom and ends a distance greater than the width of the tube to be tested, whereby the tube is held submerged beneath the roller when water is placed in the tank, said roller being provided with irregular surfaces and its circumference decreasing radically from each of the two ends to the center whereby the tube to be tested is engaged on its two side walls without contacting the intermediate portions of said tube walls.

ALEX E. LOOKHOLDER.